United States Patent Office 3,374,176
Patented Mar. 19, 1968

3,374,176

PROCESS FOR MAKING N-TYPE ZINC CADMIUM SULFIDE ELECTROLUMINESCENT MATERIAL

Ralph M. Potter, Pepper Pike, Ohio, assignor to General Electric Company, a corporation of New York No Drawing. Continuation-in-part of application Ser. No. 19,446, Apr. 4, 1960. This application Jan. 4, 1965, Ser. No. 423,368
3 Claims. (Cl. 252—62.3)

This application is a continuation-in-part of application Ser. No. 19,446 filed Apr. 4, 1960, now abandoned.

This invention relates to the preparation of n-type electroluminescent material, such expression indicating a wide band gap semiconductor exhibiting efficient luminescence in the visible and wherein conduction occurs through an excess of negative charge carriers or electrons.

It is now generally acknowledged that in order for electroluminescence to find acceptance as a light source for general illumination and compete on its own terms with conventional incandescent or discharge lamp, a more efficient light generating process must be utilized than has been up to now. The electroluminescent lamps now produced and serving for instance as night lights or markers incorporate a powdered phosphor dispersed in a dielectric material, in some cases an organic plastic and in other cases a glassy matrix. In these lamps, the process of light emission is believed to occur as a result of the collision excitation mechanism. It does not appear possible to meet the requirements of an acceptable light source for general illumination through the use of this process, because the efficiency is low compared to present light sources and the brightness which can be realized at acceptable voltages is insufficient.

A process which does offer the possibility of meeting the stated requirements is that known as injection electroluminescence. The theory here is that if a wide band gap semiconducting material such as zinc sulfide could be prepared exhibiting either n-type, that is excess negative charge carrier conductivity, or p-type, that is excess positive charge carrier conductivity, then a junction of such materials (p-n), or junctions of such materials with another having intrinsic conduction (p-i-n), could be fabricated. By passing a current through such a device, light would be efficiently generated as a result of recombination of charge carriers at the junction or in the intrinsic region. A p-n electroluminescent junction might be visualized as a junction rectifier similar to a germanium or silicon diode. Germanium and silicon are relatively narrow band gap materials and only infrared radiation or heat is produced at junctions in these materials. However by utilizing a wide band gap material such as zinc sulfide, the recombination of charge carriers of opposite sign at the junction would cause the production of visible light.

Despite the appeal of injection electroluminescence and p-n or p-i-n electroluminescent junctions, they remain as yet largely theoretical concepts. One of the principal difficulties resides in the preparation of the required material, namely the wide band gap semiconducting materials having the desired type of conductivity and also exhibiting efficient luminescence. There have been reports of p-n junction electroluminescence in a few materials as for example SiC. But the reported efficiencies have been very low. It is my belief that the reason for the observed low efficiency of electroluminescence in such materials is that these materials are not capable of efficient luminescence under any type of excitation.

Therefore the object of this invention is to provide wide band gap semiconducting materials exhibiting n-type conductivity and efficient luminescence in the visible.

The recombination of charge carriers could take place across the band gap resulting in the emission of photons whose energy is approximately equal to the band gap energy. However such recombinations have a low probability and do not result in efficient luminescence. In good phosphor materials such as those consisting of zinc-cadmium sulfides including such sulfides known as sulfoselenides wherein the sulphur is partly substituted by selenium, recombination resulting in efficient room temperature luminescence takes place in recombination centers called activators. These activators may involve a lattice vacancy as in the so-called "self-activated" centers, or they may consist of an impurity atom such as Cu or Ag. In any case they also constitute acceptor centers.

In ordinary sulfide phosphors (including sulfoselenides which are basically similar) prepared only for their luminescence response, the concentration of activator centers (acceptors) is very nearly equal to the concentration of coactivator centers (donors): such material is said to be compensated. In accordance with the invention, I propose to prepare sulfide and sulfo-selenide phosphors containing an excess of coactivator (donor-Ga and In) centers over activator (acceptor-Ag and Cu) centers and to fire them in a reducing atmosphere such as $H_2$ or Cd vapor, thereby obtaining materials which are both n-type semiconductors and good phosphors, that is efficient producers of luminescence in the visible range of the spectrum. The reducing atmosphere is necessary to prevent intrinsic acceptor formation, that is, formation of acceptors as a result of vacant metal sites.

It is known that n-type cadmium sulfide crystals having low resistivity can be prepared with relative ease by annealing CdS crystals under reducing conditions, preferably in the presence of doping agents such as gallium, indium or chlorine. However, CdS is not suitable for an electroluminescent light source because most of its recombination emission (by way of activator centers) lies in the infrared region of the spectrum. The recombination emission of ZnS activated with a suitable impurity, such as Ag or Cu lies in the visible. But attempts to make n-type ZnS by firing it with doping agents like aluminum or gallium in a reducing atmosphere such as Zn vapor have failed.

I have theorized that it might be possible to make solid solutions of zinc and cadmium sulfides or zinc and cadmium sulfo-selenides n-type provided the ratio of zinc to cadmium is not too high. Yet provided the percentage of zinc is high enough, such mixed crystals could be valuable for electroluminescence provided a substantial proportion of their recombination emission lies in the visible spectrum. I have now confirmed the validity of these theoretical considerations and experimentally established that mixed crystals of (Zn, Cd)S showing n-type conductivity can be prepared with up to at least 60% mols Zn relative to total mols of Zn and Cd.

The presence of free electrons indicating n-type conductivity has been demonstrated by two methods:

(1) Infrared absorption was found of the form $e\alpha\lambda^{\eta}$ where $e$ is the absorption coefficient, $\lambda$ is the wave length, and $\eta$ has a positive value. Such absorption is attributable to free charge carriers which, in view of the method of preparation in this case, must be free electrons.

(2) Electrical conductivity values (measured in the dark) of about $10^{-3}$ reciprocal ohm centimeters or better were found by making contact to single crystals.

While the second property above, namely high conductivity, can be demonstrated only in single crystals, the first property, namely infrared absorption, can be demonstrated either in single crystals by transmission or in powdered material by diffuse reflectance.

Various samples of zinc-cadmium sulfide were prepared as powders or single crystals according to the formula $Zn_xCd_{1-x}S$:$10^{-4}$Ga where $x$ was gradually increased up to 0.60. Also a sample of $Zn_{.4}Cd_{.6}S$:$10^{-5}$Cu, $1.1\times10^{-4}$Ga was prepared as a powder. For all of these samples, n-type conductivity was established, either by measuring infrared absorption properties, or electrical conductivity, or both.

It has been established that these n-type preparations are efficient phosphors by examining them under 3650 A. ultraviolet excitation. Samples with gallium only show bright fluorescence with colors ranging from red to yellow-orange (presumably due to "self-activation") as the mol percent of ZnS is increased from 30 to 60. Those with both gallium and copper are various shades of red for the same range of composition.

The following are examples of the preparation of wide band gap semiconductors exhibiting high free carrier (electron) concentration and capable of efficient luminescence in accordance with the invention.

*Example 1*

A solid solution of ZnS with CdS was prepared containing 40 mol percent of ZnS, that is $x$ being equal to 0.4. To this was added $10^{-4}$ mol fraction of gallium as a solution of the nitrate. The mixture was then dried, fired first in $H_2S$ at 750 to 800° C., then refired in a sealed evacuated tube with a piece of pure cadmium metal at 750 to 800° C. The sample showed reddish fluorescence under 3650 A. excitation and infrared absorption indicative of n-type conductivity. A single crystal prepared from the powder by a vapor growth method showed a conductivity of about $10^{-2}$ reciprocal ohm-centimeters.

*Example 2*

A solid solution of ZnS with CdS was prepared containing 60 mol percent ZnS, that is $x$ being equal to 0.6. To this mixture, $10^{-4}$ mol fraction of gallium was added as in Example 1 and a like firing schedule was followed, only using a temperature range of 850 to 900° C. A single crystal prepared from this powder showed bright orange fluorescence and a conductivity of about $10^{-3}$ reciprocal ohm centimeters.

*Example 3*

A solid solution of ZnS with CdS was prepared containing 40 mol percent ZnS, that is $x$ being equal to 0.4. To this mixture were added $1.1\times10^{-4}$ mol fraction of gallium and $10^{-5}$ mol fraction of copper, both as solutions of the nitrates. The same firing schedule as in Example 1 was followed. The product showed a reddish fluorescence and infrared absorption indicating the presence of free electrons.

The sulfo-selenides of zinc-cadmium wherein the sulphur is partly substituted with selenium, are basically similar to the sulfides. Therefore it is seen that a range of composition of zinc-cadmium sulfo-selenide will occur as n-type material with emission in the visible when prepared under similar conditions.

My measurements therefore show that $Zn_xCd_{1-x}S$, wherein S may be partly substituted with Se, doped with a suitable donor type impurity such as Ga or In, and containing from 0 mol percent up to at least 60 mol percent ZnS, that is in the range of $x=0$ to $x=0.6$, can be made n-type by firing in a reducing atmosphere such as cadmium vapor at a suitable temperature, at least 600° C., preferably in the range of 750 to 900° C. These materials are also capable of exhibiting efficient luminescence. If no impurity in addition to the donor impurity is added, these materials exhibit fluorescence characteristics of the donor, if any, or of "self-activation." If other impurities known to serve as activators in (ZnCd)S phosphors are added, the color characteristics of these activators will be exhibited. However, if acceptor-type impurities, such as Ag or Cu, are added, the molar concentration of these impurities must not exceed the molar concentration of the donor impurity.

For "self-activation" or activation by Ag of $Zn_xCd_{1-x}S$, the fluorescent emission lies mainly in the visible for values of $x$ about 0.3 or greater. Other activators will have other ranges of composition for which the emission lies mainly in the visible. In general then, the invention comprehends the system $Zn_xCd_{1-x}S$:$M_1$,$M_2$ where $M_1$ is an activator (acceptor) and $M_2$ is a co-activator (donor) and the molar concentration of $M_1$ does not exceed that of $M_2$, and wherein $x$ may vary from approximately 0.3 up to at least 0.6. When fired in a reducing atmosphere like cadmium vapor at a suitable temperature, this system forms new wide band gap semiconductor materials capable of efficient luminescence in the visible range of the spectrum.

The n-type wide band-gap semiconductor or phosphor of the invention is essentially different from previously known phosphors in which charge compensation occurred. Such charge compensation could occur as a result of having in the original material about equal concentrations of acceptors and donors. Alternatively charge compensation could be caused by failure to observe the necessary firing conditions resulting in intrinsic acceptor or donor formation which produced the same result. An example of the latter is the phosphor described in U.S. Patent 3,010,909, Klasens et al. and consisting of zinc cadmium sulphide activated with silver or copper and coactivated with gallium or indium. It is specified that the number of trivalent gallium or indium atoms exceeds the number of divalent silver or copper atoms by at least 10%. However the materials are fired in an $H_2S$ atmosphere at 1000° C.; this cannot produce results equivalent to mine because $H_2S$ under the stated conditions is not reducing. Therefore charge compensation by intrinsic acceptor formation will occur and n-type conductivity will not result.

If the statement that $H_2S$ is not reducing under the stated circumstances appears surprising in view of the known fact that $H_2S$ is a combustible gas which burns readily in air, the explanation resides in the use of the term "oxidizing" in the more general sense of "tending to reduce the proportion of the metallic constituent in a compound." F. A. Kroger in British Journal of Applied Physics, Supplement No. 4, 1955, pages 58–59, states the matter thus (p. 59, art. 3, 2nd paragraph): "Whether $H_2S$ acts in one way or another depends on whether the sulphur pressure formed by the dissociation of $H_2S$ is greater or less than the sulphur pressure above stoichiometric ZnS. The former is known, but the latter is not: therefore the character of $H_2S$ has to be determined from the way it affects the optical and electrical properties of ZnS."

I have confirmed that the Klasens et al. method of preparation does not produce an n-type material equivalent to mine by the following experiment (which at the same time shows that, by Kroger's definition above, $H_2S$ is oxidizing with respect to ZnCdS at 1000° C.).

I used a crystal consisting of approximately 60 mol percent ZnS; 40 mol percent CdS and $10^{-3}$ mol fraction Ga which had been fired in Cd vapor at 900° C. for 48 hours and quenched by plunging the firing tube into cold water. The resistivity was measured by a 4-point contact method using fused indium contacts. A value of about 20 ohm centimeters was found and the conductivity was also determined to be n-type.

The contacts were removed and the crystal refired in a sealed tube containing one atmosphere of $H_2S$ at 1000° C. for 24 hours in accordance with Klasens and quenched as before. The resistivity, measured as before, was now about $1\times10^7$ ohm-centimeters.

This very great increase in resistivity (or loss of conductivity) indicates that the n-type conductivity had been largely destroyed. The experiment shows that $H_2S$ at 1000° C. (pressure of the order of 1 atmosphere) is definitely oxidizing (in the sense of S. A. Kroger supra). More importantly, it shows that Klasens, in firing his phosphors in $H_2S$ at 1000° C. could not have obtained the strong n-type conductivity which I have obtained by firing in a reducing atmosphere, and therefore could not have obtained an equivalent material.

The examples which have been given herein are of course intended as exemplary of the invention and not as limitative. The scope of the invention is to be determined by the appended claims.

What I claim as new and desire to secure by Letters Patent of the United States is:

1. The method of preparing a zinc-cadmium sulfoselenide wide band gap semiconducing phosphor having high and predominantly n-type conductivity and emission bands in the visible spectrum and being suitable for injection electroluminescence comprising preparing a solid solution of ZnS with CdS containing from about 0.3 to about 0.6 mol of Zn per total mols of Zn plus Cd and wherein the S may be partly substituted with Se, adding thereto $10^{-4}$ mol fraction of gallium, firing in $H_2S$ at a temperature in the range of 750 to 900° C., and then refiring in vacuo in the presence of madmium at a temperature in the range of 750 to 900° C.

2. The method of preparing a zinc-cadmium sulfoselenide wide band gap semiconducting phosphor having high and predominantly n-type conductivity and emission bands in the visible spectrum and being suitable for injection electroluminescence comprising preparing a solid solution of ZnS with CdS containing from about 0.3 to about 0.6 mol of Zn per total mols of Zn plus Cd and wherein the S may be partly substituted with Se, adding thereto $1.1 \times 10^{-4}$ mol fraction of gallium and $1.0 \times 10^{-5}$ mol fraction of copper, firing in $H_2S$ at a temperature in the range of 750 to 900° C. and then refiring in vacuo in the presence of cadmium at a temperature in the range of 750 to 900° C.

3. The method of preparing a wide band gap semiconducting phosphor having high and predominantly n-type conductivity and emission bands in the visible spectrum and being suitable for injection electroluminescence, which consists in firing $Zn_xCd_{1-x}S$ with a donor impurity from the group consisting of Ga and In and an acceptor impurity from the group consisting of Ag and Cu, the molar concentration of the acceptor impurity being less than that of the donor impurity and wherein the sulphur may be partly substituted with selenium and wherein $x$ may vary from about 0.3 up to about 0.6, in $H_2S$ at a temperature in the range of 750 to 900° C., and then refiring in an atmosphere of cadmium vapor at a temperature in the range of 750 to 900° C.

References Cited

UNITED STATES PATENTS

| | | | |
|---|---|---|---|
| 2,947,705 | 8/1960 | Apple | 252—301.6 |
| 3,010,909 | 11/1961 | Klasens et al. | 252—301.6 |

TOBIAS E. LEVOW, *Primary Examiner.*

ROBERT D. EDMONDS, *Examiner.*